United States Patent
McFerron

[15] 3,704,030
[45] Nov. 28, 1972

[54] PROTECTOR SCREEN FOR TRACTOR DRIVERS

[72] Inventor: Paul E. McFerron, Route 5, Siloam Springs, Ark. 72761

[22] Filed: March 2, 1970

[21] Appl. No.: 15,418

[52] U.S. Cl. ............................. 280/150 R, 296/102
[51] Int. Cl. ............................................. B60r 27/00
[58] Field of Search ...280/150 B, 150 C, 150 F, 150, 280/152; 296/102; 214/672, 674

[56] References Cited

UNITED STATES PATENTS

| | | |
|---|---|---|
| 2,263,978 | 11/1941 | Branovic et al............214/672 |
| 2,805,887 | 9/1957 | Selby.........................296/102 |
| 2,969,255 | 1/1961 | Nystrom.....................296/102 |
| 3,463,508 | 8/1969 | Killen.........................280/152 |

*Primary Examiner*—Leo Friaglia
*Assistant Examiner*—Winston H. Douglas
*Attorney*—Head & Johnson

[57] ABSTRACT

An upper convex protective screen and frame is mounted upon a tractor chassis or axle and includes in combination therewith a plurality of depending chain members which are adapted to allow movement of rear tractor hitch mechanisms yet provide protection to the lower torso of the tractor driver from debris, rocks, etc. thrown by adjacent tractor mounted mowing devices.

4 Claims, 2 Drawing Figures

PATENTED NOV 28 1972 3,704,030

PROTECTOR SCREEN FOR TRACTOR DRIVERS

BACKGROUND OF THE INVENTION

Mowing of large acreage and more particularly the right of way adjacent highways, freeways and turnpikes is usually accomplished by a plurality of tandem oriented mowers mounted upon tractors. Because of the irregularities of the surface, debris, small tree limbs, etc. and especially gravel and rocks are thrown by the mowing machines with tremendous energy. Such projectiles have been known to injure or do serious harm to the adjacent or forward tractor drivers.

Protective devices for tractors or the like have as such been proposed in the art such as those found in the following U.S. Pat. Nos.:

| 2,263,978 | 2,296,255 |
| 2,805,887 | 3,265,428 |
|           | 3,463,508 |

However, these devices have not provided for adequate protection to the lower torso, usually the legs, of the tractor driver and hence have been completely inadequate to meet the problem. The placement of rigid protective devices to protect the lower torso of the driver have been limited because of the necessary requirement of having a flexible rear hitch which is capable and must be moved in directions upward and downward and transversely thereto.

SUMMARY OF THE INVENTION

This invention provides apparatus for overcoming the objections to that heretofore known in the art and further provides apparatus for completely protecting a tractor driver from objects thrown by adjacent mowers or other devices toward the rear of the tractor and driver.

This invention further provides the combination of an upper convex relatively rigid protective screen plus a plurality of depending flexible chain members filling the space therebelow yet adaptable to permit movement of the hitch mechanism within the space below the rigid protective screen.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
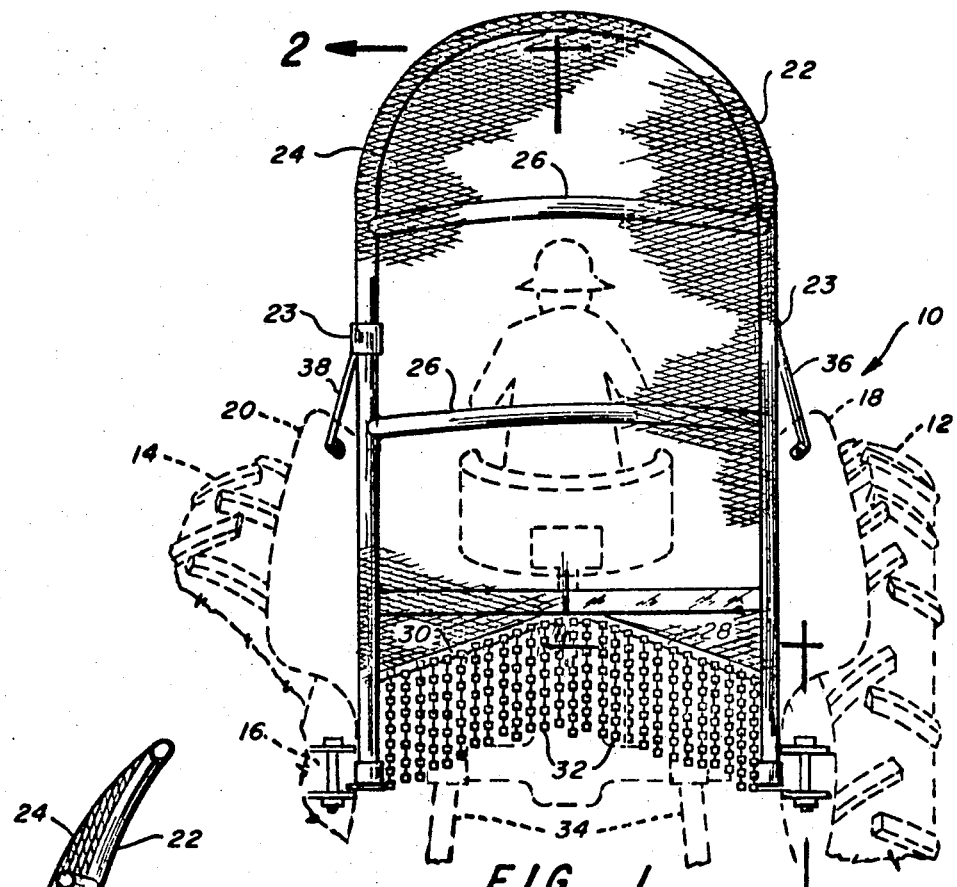
FIG. 1 is a rear elevational view showing the apparatus of this invention attached to a tractor.

Referring now to FIG. 1 the rear end of a typical tractor generally designated by the numeral 10 includes rear wheels 12 and 14 suspended by an axle 16. Fenders 18 and 20 are attached to the axle or chassis of the tractor in a manner well known to those skilled in the art. This invention comprises a tubular frame member 22 which extends upwardly and arcuately from a point in line with the axle to above the head of the tractor driver when in his normal seated position, although in some instances the frame may extend upwardly further to protect the driver in those instances where it is necessary to stand while operating the tractor. A rigid expanded metal screen 24 is welded or otherwise attached to the framework. The framework includes a plurality of cross members 26 defined in the framework terminating with the bottom cross members 28 and 30 to which a plurality of chain members are attached so as to hang and depend therefrom. As such, hitch or other mechanism 34, partially shown, is then adaptable for movement upwardly, downwardly and transversely from side to side yet the chains provide adequate protection to the lower portion of the operator especially legs and feet, from debris, rocks and other matter that may be slung from an adjacent mowing tractor device or deflected into the operator's position. Angular braces 36 and 38 are attached to the tubular outer frame 22, for example, by a hinged connection or to a sleeve 23. The braces extend outwardly and are bolted or otherwise attached to the fenders 18 and 20 respectively.

Figure 2:
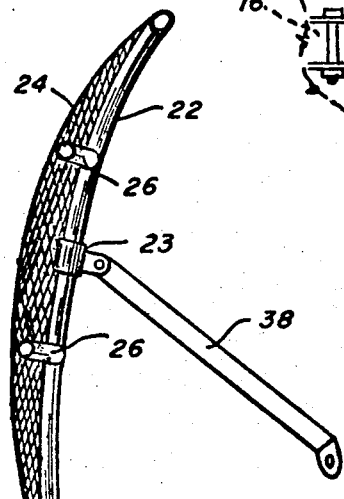
FIG. 2 is a partial sectional view taken along the line 2—2 of FIG. 1.

Referring now to FIG. 2 the frame 22 is attached, at its lower end to the axle 16 by member 40. A cylindrical protrusion 42 extending at the rear end thereof is adapted to be inserted within the lower end of tubular frame member 22 and retained by a bolt and nut 44. The member 40 is then attached to the axle by the placement of a lower plate 46 through which a plurality of bolt members 48 retain the system to the axle. The downward free end of chains 32 are preferably no longer than to a point substantially even with the bottom of the rear axle housing.

What is claimed is:

1. Apparatus for protecting tractor operators from projectiles thrown towards the operator from the rear comprising:

a rigid frame attached to the tractor chassis at the rear thereof and behind the operator's normal position, said frame extending substantially between rear wheel fenders of said tractor, from a lower transverse frame positioned above the normal operating movement limits of rearward tractor attachements, to upwardly above said operator's normal position;

a rigid screen attached to said frame so as to form a convex rearward surface; and a plurality of side by side chain pieces hanging from said lower transverse frame.

2. Apparatus of claim 1 including pivotal braces extending from said frame to attachment with said wheel fenders.

3. Apparatus of claim 2 wherein said rigid frame is attached at its lower end to the rear axle housing of said tractor.

4. Apparatus of claim 1 wherein the bottom end of said chains will extend at least to an imaginary plane through the rear axle housing and parallel to the ground surface.

* * * * *